March 31, 1953            G. E. DATH            2,633,352
SHOCK ABSORBER FOR RAILWAY CAR TRUCKS
Filed Feb. 25, 1949
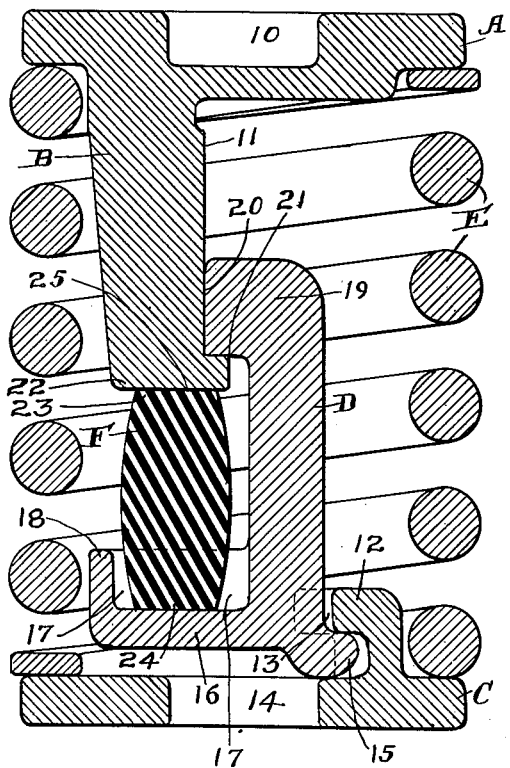
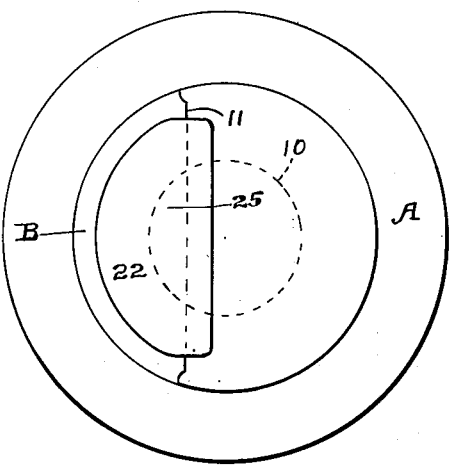
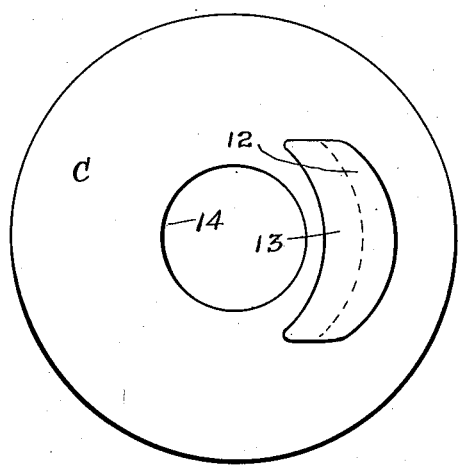
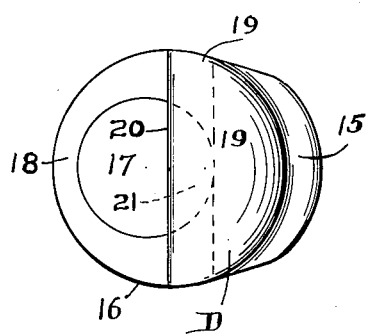
Inventor:
George E. Dath.
By Henry Fuchs.

Patented Mar. 31, 1953

2,633,352

UNITED STATES PATENT OFFICE 2,633,352

SHOCK ABSORBER FOR RAILWAY CAR TRUCKS

George E. Dath, Mokena, Ill., assignor to W. H. Miner, Inc., Chicago, Ill., a corporation of Delaware Application February 25, 1949, Serial No. 78,330

6 Claims. (Cl. 267—9)

This invention relates to improvements in shock absorbers especially adapted for use as snubbing devices for dampening the action of railway car truck springs.

One object of the invention is to provide a friction shock absorber comprising a pair of friction posts having lengthwise sliding engagement with each other and spring means yieldingly opposing relative movement of the posts toward each other, wherein one of the posts is mounted for rocking movement laterally toward the other and is forcibly rocked against the latter by pressure created through relative lengthwise movement of said posts toward each other.

A further object of the invention is to provide a shock absorber as set forth in the preceding paragraph, wherein the post which has rocking movement is provided with a lever arm subjected to pressure exerted by the other post during relative approach of the posts to force the same into tight frictional contact with each other.

A more specific object of the invention is to provide a friction shock absorber comprising a pair of friction posts having lengthwise sliding engagement with each other, and spring means yieldingly opposing relative movement of the posts toward each other, one of said posts being rockingly supported on a base member for swinging movement toward the other post and having a lever arm thereon, subjected to pressure exerted by said other post during relative approach of the posts lengthwise of the mechanism to force said posts into tight frictional engagement with each other, wherein the pressure is transmitted from said other post to the lever arm through an interposed resilient element.

Other objects of the invention will more clearly appear from the description and claims hereinafter following.

In the accompanying drawing forming a part of this specification, Figure 1 is a transverse, vertical sectional view of the improved shock absorber. Figure 2 is a bottom plan view of the top friction post illustrated in Figure 1. Figure 3 is a top plan view of the bottom follower of improved shock absorber. Figure 4 is a top plan view of the bottom friction post illustrated in Figure 1.

My improved shock absorber, as illustrated in the drawing, comprises broadly a top follower A, a top friction post B formed rigid with the follower A, a bottom follower C, a bottom friction post D supported for rocking movement on the follower C, a spring E yieldingly opposing movement of the followers toward each other, and a rubber pressure transmitting element F reacting between the top and bottom friction posts B and D.

The follower A is in the form of a heavy disc-like plate, having the top friction post B depending therefrom, the post B being at the left hand side of said follower, as clearly shown in Figure 1, and formed integral with said follower. The follower A is provided with a central, upwardly opening seat 10, adapted to accommodate the usual spring centering projection of the top follower plate of the usual truck spring cluster of a railway car truck.

The post B has a lengthwise extending, flat friction surface 11 on its inner side and a laterally inwardly projecting, horizontal stop flange 22 at its lower end.

The follower C is also in the form of a relatively heavy, disc-like plate having an upstanding arc-shaped pivot lug 12 at the right hand side thereof. The lug 12 has an inturned flange 13 at its upper end, overhanging the follower C. A central opening 14 is preferably provided in the follower C, adapted to receive the spring centering projection of the usual bottom spring follower plate of the truck spring cluster.

The bottom post D is pivotally supported on the follower C for rocking movement toward the post B, being provided with a laterally outwardly projecting fulcrum flange 15 at its lower end engaged between the flange 13 of the lug 12 and the top side of the follower C. On the inner side, at the lower end thereof, the post D has a laterally projecting lever arm 16 rigid therewith. The lever arm 16 extends beneath the post B at a level above the follower C to provide clearance for rocking movement. The lever arm 16 is formed with an upwardly opening pocket 17, adapted to accommodate the lower end portion of the rubber element F, the pocket being defined by a peripheral upstanding flange 18 on said arm.

The post D is laterally inwardly enlarged at its upper end, as indicated at 19, said enlarged portion being provided with a flat, vertically extending friction surface 20 on its inner side engaged with the friction surface 11 of the post B. The friction surface 20 of the enlarged portion 19 of the post D is laterally inwardly offset with respect to the corresponding side face of the main body portion of said post, thereby providing a transverse stop shoulder 21 at the inner end of the friction surface 20, which overhangs the flange 22 of the post B and is engageable therewith to limit longitudinal separation of the posts and hold the mechanism assembled.

The rubber element F is in the form of an elongated block of substantially cylindrical shape, having flat top and bottom end faces 23 and 24 abutting the lower end of the post B, which is substantially flat, as indicated at 25, and the top side of the lever arm 16 of the post D, respectively, the lower end of said block being engaged in the pocket 17 of the lever arm 16. As shown, the block F is tapered outwardly toward its top and bottom ends, the outer surface thereof being preferably curved in vertical direction.

The spring E is in the form of a heavy helical coil and surrounds the posts B and D, having its top and bottom ends bearing, respectively, on the top and bottom followers A and C.

My improved shock absorber replaces one or more of the spring units of a spring cluster of a railway car truck, being interposed between the usual top and bottom spring follower plates of the cluster, and is compressed between the spring plates of said cluster in unison with the truck springs.

The operation of my improved shock absorber is as follows: Upon relative approach of the spring follower plates of the truck spring cluster, the post B is forced downwardly toward the post D against the resistance of the spring E and also against the resistance offered by the rubber block F. During this action, the pressure is transmitted from the post B through the rubber block F to the lever arm 16 of the post D, thereby rocking the post D toward the post B and pressing the friction surfaces of the posts into tight frictional engagement with each other. Inasmuch as the friction surface 11 of the post B is in sliding engagement with the surface 20 of the post D, during this action, high frictional resistance is provided to effectively snub the action of the truck springs. As will be evident, the pressure transmitted through the rubber element or block F to rock the post D progressively increases during compression of the mechanism, thereby correspondingly increasing the pressure between the posts D and B to provide progressively increasing frictional resistance to snub the action of the truck springs.

I claim:

1. In a shock absorber, the combination with a friction element; of a second friction element, said elements being in lengthwise sliding engagement with each other; a support on which said second named element is pivoted for rocking movement toward said first named element; a lever arm on said second named element; yielding means interposed and reacting between said lever arm and the inner end of said first named element; and spring means between said first named element and support for yieldingly opposing movement of said first named element and support toward each other lengthwise of the mechanism.

2. In a shock absorber, the combination with a friction post; of a second friction post; a base on which said second post is pivotally supported for rocking movement laterally toward said first named post, said posts having lengthwise sliding frictional engagement with each other on their inner sides; a lever arm extending laterally inwardly from said second named post; a compressible yielding rubber element interposed between the inner end of said first named post and said lever arm of said second named post; and spring means between said first named post and base for yieldingly opposing movement of said first named post and base toward each other lengthwise of the mechanism.

3. In a shock absorber, the combination with a friction member having a lengthwise extending friction surface on the inner side thereof; of a follower, said follower and friction member being movable toward each other lengthwise of the mechanism; spring means between said follower and friction member for yieldingly opposing movement of said follower and friction member lengthwise toward each other; a second friction member having a lengthwise extending friction surface on the inner side thereof slidingly engaged with the friction surface of said first named member, said second named member being pivoted to said follower; and a rubber block having one end abutting said first named member and the other end abutting said second named member for rocking the latter toward said first named member.

4. In a shock absorber, the combination with a follower; of a second follower, said followers being relatively movable toward each other; a friction post on said first named follower rigid therewith and projecting toward said second named follower; a second friction post pivotally connected to said second named follower to rock laterally toward said first named post, said posts being in sliding frictional contact with each other; a laterally extending lever arm rigid with said second named post; a rubber block bearing at opposite ends on the inner end of said first named post and on said lever arm of the second named post; and a spring surrounding said posts and bearing at opposite end on said followers.

5. In a shock absorber, the combination with a pair of slidingly engaged friction posts, one of said posts having a follower at its outer end rigid therewith; of a follower at the outer end of the other post on which said post is pivotally supported for swinging movement toward the friction post which has the follower rigid therewith; spring means surrounding said posts and bearing at opposite ends on said followers; a laterally projecting rigid lever arm on said swinging post; and a rubber block bearing at one end on the inner end of said post which has the rigid follower and at its other end on said lever arm.

6. In a shock absorber, the combination with a follower; of a second follower, said followers being relatively movable toward and away from each other lengthwise of the mechanism; a friction post on said first named follower rigid therewith and projecting toward said second named follower, said post having a lengthwise extending friction surface on the inner side thereof; a second friction post carried by said second named follower and projecting toward said first named follower, said second named post having a friction surface on its inner side in sliding engagement with the friction surface of said first named post; a laterally projecting lever arm on said second named post at the inner side thereof opposed to the inner end of said first named post; a rubber block supported at one end on said lever arm and having its opposite end abutting the inner end of said first named post; and a coil spring surrounding said posts and bearing at opposite ends on said followers.

GEORGE E. DATH.

REFERENCES CITED

The following references are of record in the file of this patent:

UNITED STATES PATENTS

| Number | Name | Date |
|---|---|---|
| 1,942,188 | Schmidt | Jan. 2, 1934 |
| 2,091,783 | Lazna | Aug. 31, 1937 |
| 2,254,781 | Rabbitt | Sept. 2, 1941 |
| 2,342,499 | Sproul | Feb. 22, 1944 |
| 2,386,107 | Geiger | Oct. 2, 1945 |
| 2,494,300 | Light | Jan. 10, 1950 |